United States Patent [19]

Morrison et al.

[11] 3,893,585
[45] July 8, 1973

[54] AUTOMOBILE ARM REST TAPE HOLDER

[76] Inventors: Gary N. Morrison, 333 Chase Rd., Columbus, Ohio 43214; Stanley Roger Ward, 2356 Brentnell Ave., Columbus, Ohio 43211

[22] Filed: Oct. 29, 1973

[21] Appl. No.: 410,637

[52] U.S. Cl.............................. 220/22.6; 206/387
[51] Int. Cl............................................... B65d 57/00
[58] Field of Search ........ 220/22.6, 22.1, 1 A, 22.2, 220/22.3, 22.4, 22.5; 206/74, 387; 296/37 R; 297/115, 116

[56] References Cited
UNITED STATES PATENTS

| | | | |
|---|---|---|---|
| 903,368 | 11/1908 | Flanders | 220/22.2 |
| 1,541,173 | 6/1925 | Ormond | 220/22.6 |
| 2,724,524 | 11/1955 | Moore | 220/22.3 |
| 3,674,132 | 7/1972 | Loss | 206/387 |

Primary Examiner—William I. Price
Assistant Examiner—Steven M. Pollard
Attorney, Agent, or Firm—Mahoney, Miller & Stebens

[57] ABSTRACT

A storage compartment in an automobile arm rest for recording tapes is provided having a spring-biased follower plate. The storage compartment includes an interior cavity of dimensional configuration adapted to receive sound recording tapes in upright relationship. The follower plate is positioned within this cavity and is spring-biased to maintain the tape containers or cartridges in an upright, serially disposed relationship. Removal or the insertion of one or more tapes is accommodated by the biasing spring.

10 Claims, 6 Drawing Figures

PATENTED JUL 8 1975  3,893,585

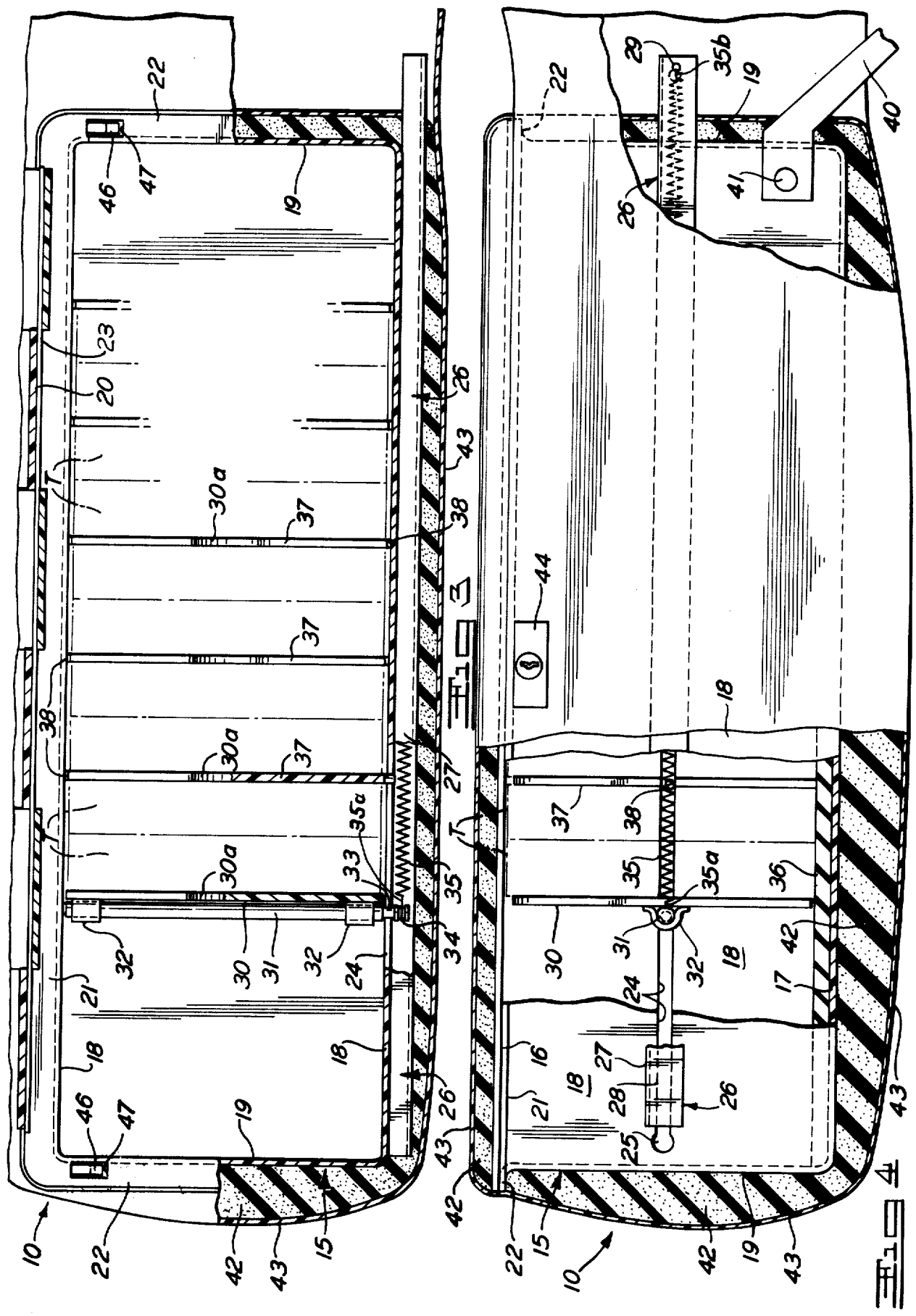

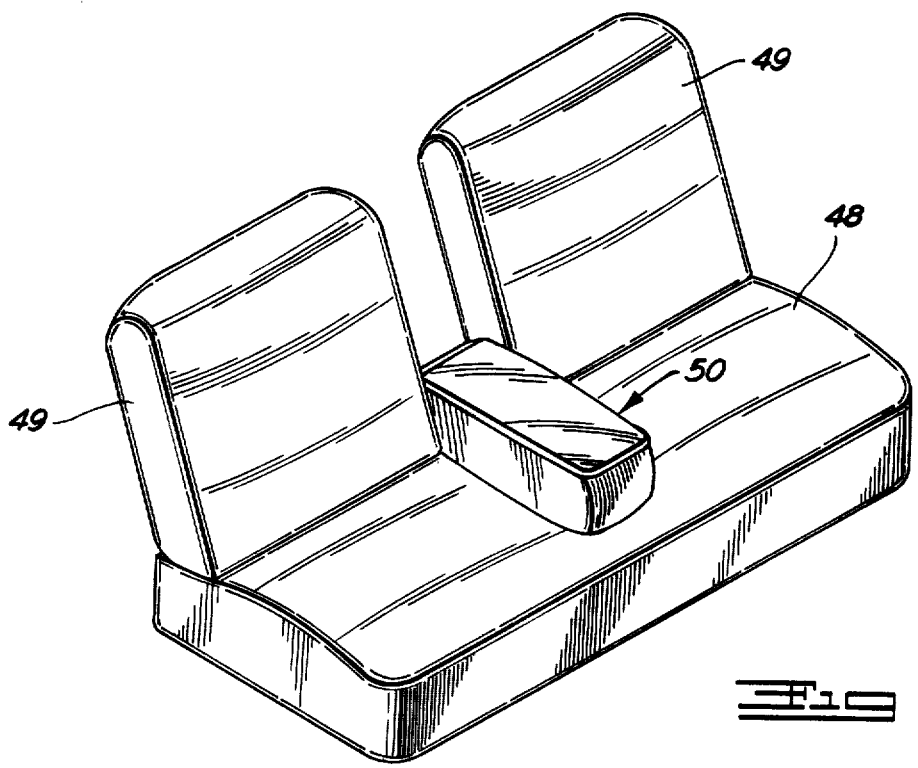
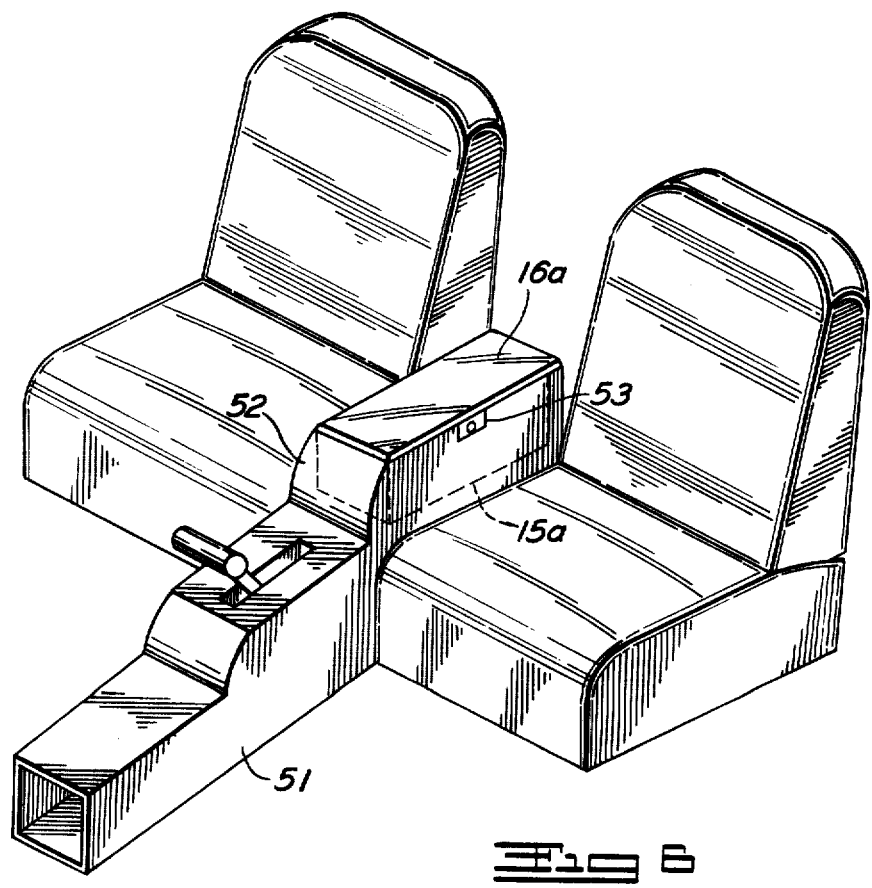

3,893,585

AUTOMOBILE ARM REST TAPE HOLDER

BACKGROUND OF THE INVENTION

This invention is directed to the storage of sound recording tapes in automotive vehicles. These tapes may be of either the cartridge or cassette type, and the vehicle operator generally retains or stores a substantial number of these tapes in the vehicle. Heretofore, little effort has been directed toward developing of storage compartments specifically adapted to articles of this type. In general, it has been the practice to either loosely strew a number of the tapes on the car seat or to loosely store these tapes in an open top container.

The disadvantage of this crude storage is that the tapes are subject to physical damage as well as deterioration as a consequence of high temperatures and sunlight within the vehicle when parked. The high temperatures and sunlight dimensionally distort the tapes with consequent deterioration of the sound quality and often results in complete destruction. Physical damage may include structural damage to the cases preventing utilization with the electrical transcribing equipment as well as actual breaking of the tape. A further disadvantage is the safety hazard presented to a vehicle's occupants. The loosely stored and otherwise unrestrained tapes become hazardous missiles in the event of sudden stops or accidents. Additionally, a vehicle operator can become sufficiently distracted in locating a tape while the vehicle is moving as to lose control of the vehicle.

SUMMARY OF THE INVENTION

A storage compartment for incorporation into an automobile arm rest is provided by this invention for convenient and safe storage of the sound recording tapes. This storage compartment enables efficient utilization of limited space within the vehicle while providing an orderly and readily accessible storage space for a substantial number of the tapes. An arm rest structure of the general configuration such as the center arm rest in a number of vehicle seat styles is particularly suitable for a storage compartment of this invention. Incorporation in the arm rest permits the storage compartment to be readily swung out of the way to a space where it does not otherwise interfere with the vehicle seating arrangement. The tapes are not only stored at a location conveniently accessible to the vehicle operator but safety is further enhanced in that the tapes are always restrained and cannot present a missile hazard.

The storage compartment is preferably pivotly secured by brackets to the vehicle frame as an anti-theft measure as well as providing a structurally adequate arm rest. The compartment is completely enclosed with a thermal insulating material which also provides and functions as a protective upholstery padding. A hinged cover is provided for the compartment and may be locked for further anti-theft security.

Positioned within the interior of the compartment is a follower plate which is spring biased against the end most tape cartridge or cassette of a series of the stacked cartridges. Spring means is provided to urge the follower plate into engagement with the stacked tapes. Additional vertically disposed partition plates are preferably provided for interposition between adjacently disposed tapes. These partition plates are provided with notches or recesses in the upper end and facilitate gripping of a particular tape for removal as well as facilitating insertion of a tape.

These and other objects and advantages of this invention will be readily apparent from the following detailed description of an embodiment thereof and the accompanying drawings.

DESCRIPTION OF THE DRAWING FIGURES

FIG. 3 is a horizontal sectional view taken along line 3—3 of FIG. 2.

FIG. 4 is a side elevational view as seen on the plane of line 4—4 of FIG. 2 with portions thereof broken away.

FIG. 5 is a perspective view of a different form of automotive vehicle seat provided with a center arm rest incorporating a tape storage compartment of this invention.

FIG. 6 is a perspective view of the front seat area of a vehicle provided with a center console incorporating a tape storage compartment of this invention.

DETAILED DESCRIPTION OF THE ILLUSTRATED EMBODIMENT

Figure 1:
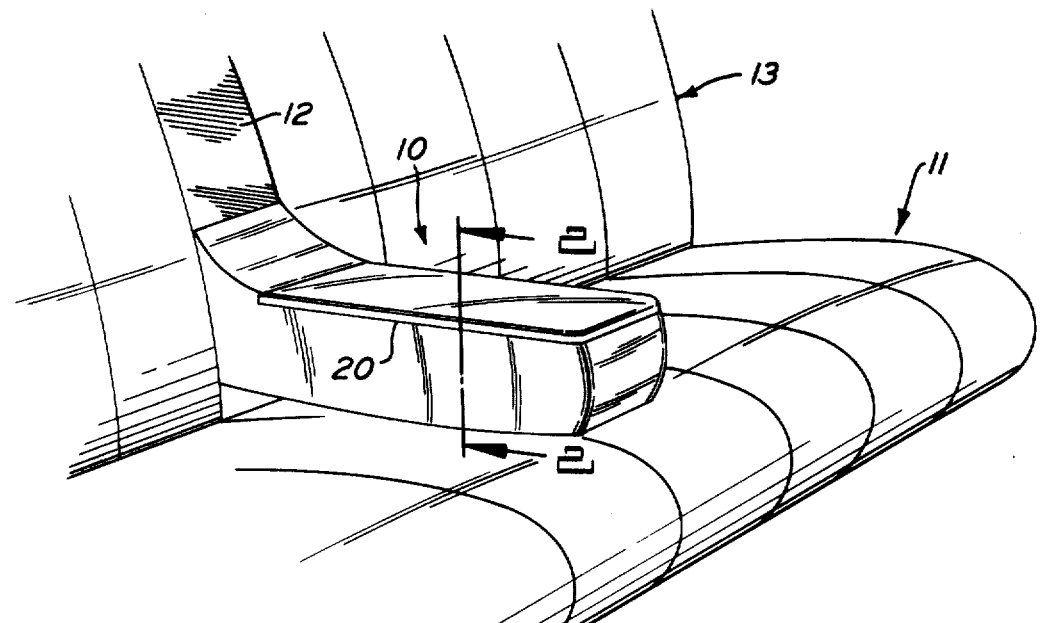
FIG. 1 is a fragmentary perspective of an automotive vehicle seat provided with a center arm rest incorporating a tape storage compartment of this invention.

FIG. 1 shows an installation of an arm rest embodying this invention in an automobile vehicle environment. In that figure the arm rest 10 is shown in a down or horizontal position with respect to the vehicle seat 11. One end of the arm rest 10 is mechanically interconnected to the framework of the seat (not shown) and is pivotable to an upright position in a recess 12 formed in the seat back 13.

Figure 2:
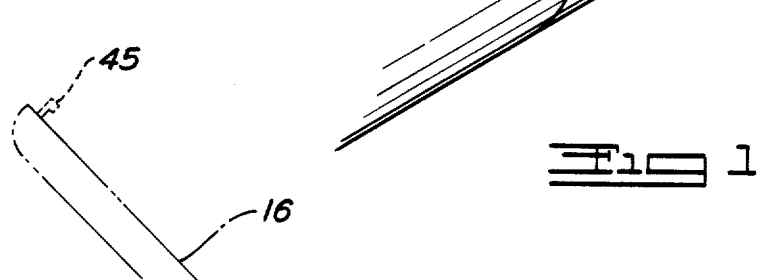
FIG. 2 is a vertical sectional view taken along line 2—2 of FIG. 1.
Figure 2:
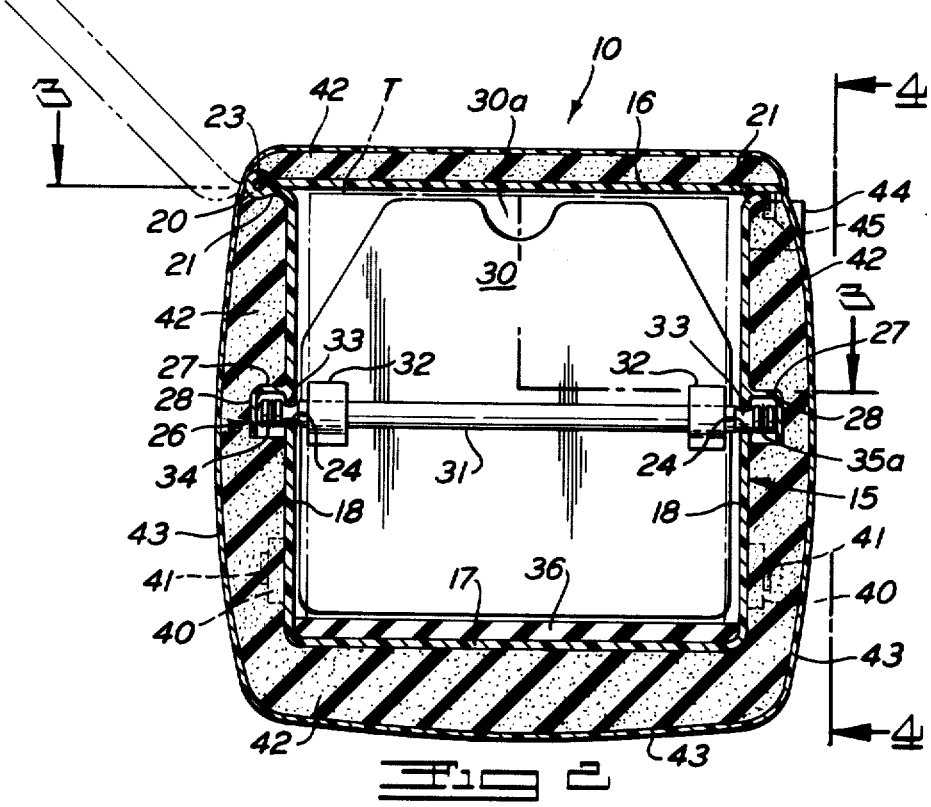

Details of the construction of this arm rest are shown in FIGS. 2, 3 and 4. In these figures it will be seen that the arm rest incorporates a storage compartment adapted to receive sound recording tapes that may either be of the cartridge or cassette type. Either type of the tape includes a container that is generally rectangular in shape of predetermined thickness and several of these tapes are positionable in this storage compartment.

Forming the storage compartment is an elongated, structurally rigid body 15 which is open at the top and provided with a hinged cover 16. The body 15 includes a bottom wall 17 with a pair of upright sidewalls 18 and end walls 19. The body 15, as well as the cover 16, may be molded from a suitable thermosetting plastic material such as polystyrene or polyvinylchloride and are of a thickness to achieve the necessary structural strength.

In the illustrated embodiment, the cover 16 is connected to the body 15 by a hinge structure 20 which extends along the longitudinal side of the arm rest. The upper edges of the sidewalls 18 and end walls 19 are preferably formed with outwardly directed flanges 21 and 22 respectively to provide a seating face for cover 16. The hinge structure 20 may be of a type known as a piano hinge with the several elements thereof integrally formed with the flange 21 and the marginal edge portion of the cover 16. A hinge pin 23 extends through the hinge elements and secures the cover to the body 15.

Formed in each sidewall 18 is an elongated slot 24 which extends the length of the body 15. These slots 24 are of a length to extend substantially the entire length of the body 15 and are formed at the approximate vertical midpoint of the respective sidewalls. A circular aperture 25 is also formed in each sidewall at one terminal end of each slot. This aperature 25 has a diameter that is greater than the width of the slot 24 and is connected with the slot.

An L-shaped housing 26 is also formed with each sidewall 18 on the exterior of the body 15. This L-shaped housing 26 may be integrally formed with the sidewall and includes an outwardly projecting web 27 disposed immediately above the slot 24 and downwardly projecting flange 28. The flange 28 is of a length as to overlie the slot 24 and extends the entire length of the slot. Referring specifically to FIGS. 3 and 4, it will also be noted that this L-shaped housing 26 extends a distance beyond one of the end walls 19 but does not overlie the aperture 25. A small aperture 29 is formed in the flange 28 adjacent the terminal end of this projection.

Disposed in the interior cavity of the elongated body 15 is a follower plate 30. This plate is of a general rectangular configuration adapted to be disposed in upright, transverse relationship within the cavity. Attached to one side of the plate at the approximate mid elevation is an elongated shaft 31 having trunnions formed therewith and projecting a distance axially outward from each side of the plate 30. A pair of bearing blocks 32 may be formed on the surface of the plate 30 to receive the shaft 31. The follower plate 30 as well as the bearing blocks 32 may be advantageously formed from a plastic material of the same type as the body 15. Each of the trunnions formed on the end of the shaft 31 project through a respective slot 24 and thereby support the follower plate 30 within the body cavity. A portion of this trunnion is of a reduced diameter 33 which is positionable in the slot. The relatively enlarged adjacent portions of the trunnion which are of a diameter greater than the width of the slot 24 but smaller than the diameter of the aperture 24 prevent axial displacement or withdrawal of the shaft from the slots. Assembly of the shaft is accomplished through insertion of the shaft through the aperture 25 at the end of the slots 24 and which does not underlie the L-shaped housing 26. A grooved projection 34 is formed on the outer end of each trunnion.

Biasing of the follower plate 30 for movement longitudinally of the body 15 is effected by a helical coil spring 35. This spring extends longitudinally within the L-shaped housing 26 and is formed with hook ends 35a and 35b. One of the hook ends 35a extends around the groove projection 34 of the shaft 31 while the opposite end 35b is inserted in the aperture 29. This spring is of a design such that, when fully contracted, it will position the follower plate 30 in contact with the end wall 19 adjacent the apertured end of the housing 26. The length of the extension of the housing 26 is determined by this contracted length of the spring to thereby assure effective operation of the follower plate throughout the length of the body 15. The tapes T are thus tightly maintained in stacked relationship between the follower plate 30 and one endwall 19 in a secure and orderly arrangement.

Also positioned within the body cavity is a layer 36 of cushioning material to provide additional protection for the tapes. This layer of cushioning material may be formed from a foamed plastic material having a resilient characteristic and is positioned in overlying relationship to the bottom wall 17. The thickness of this layer is determined by its resilient characteristic so as to support a number of the tape cartridges or cassettes without effective loss of resiliency. It will be noted in FIG. 4 that the follower plate 30 is supported by shaft trunnions on the sidewalls 18 with the bottom edge slightly above the upper surface of the cushioning layer 36. Thus there will be no interference to the longitudinal movement of the follower plate 30 throughout the body cavity.

A number of partition plates 37 are also provided for better protection of the tapes and to facilitate their insertion or removal from the body 15. These partition plates 37 are best seen in FIGS. 3 and 4 and merely comprise flat, rectangular plates provided with the laterally extending trunnions 38 at each side. These trunnions are formed at approximately the mid elevational points of the plate and project into the respective slots 24 of the sidewalls. These trunnions thus support partition plates 37 for movement longitudinally of the body 15 with the bottom edge above the cushioning layer 36. Each of the partition plates 37 may be formed from a suitable plastic material, and each plate is provided with a recess or notch similar to a notch 30a formed in the top marginal edge portion of the follower plate 30 to facilitate gripping of the tape cartridge or cassette.

Attachment of the arm rest 10 to the vehicle seat frame is best seen in FIG. 4. In that figure a fragmentary end portion of one of a pair of hinge brackets 40 is shown interconnected with the body 15. A pivot pin 41 extends through the terminal end of each of the brackets 40 and is secured to the respective sidewall 18 of the body 15. This pivotal interconnection is also seen in FIG. 2. The point of attachment of the pivot pin 41 is adjacent the bottom of the body 15 resulting in the bottom surface of the arm rest being closely aligned with the surface of the seat back 13 when the arm rest is pivoted to an upright position in the recess 12.

Thermal protection for the stored tapes is provided by a layer 42 of insulating material that is applied to all exterior surfaces of the body 15 as well as the cover 16. This insulating layer 42 may be formed from a synthetic resin material and can be adhesively bonded to the respective surfaces. A layer 43 of upholstery material is also preferably applied to the outer surfaces of the insulating layer 42 providing protection for that material and enhancing the appearance of the arm rest. The upholstery layer 43 also extends rearwardly from the pivoted end of the arm rest and is secured to the seat structure for a more finished appearance.

A latch device of the key lock type is provided to secure the cover 16 in closed relationship to the body 15. This latch device includes a lock device 44 attached to the sidewall 18 of the body immediately beneath the flange 21 and a latch tongue 45 formed with the cover 16.

A pair of leaf springs 46 are mounted on the end wall flanges 22 to assure that the cover 16 will be partially opened whenever the lock device 44 releases the tongue 45. Each leaf spring is mounted in a respective recess 47 formed in the upper surface of the flange adjacent the pivot axis of the cover 16 with a portion thereof normally flexed upwardly out of the plane of the flange surface. With the cover 16 closed, the springs 46 will be forced into their respective sockets 47. Release of the cover permits the springs to flex to their normal position thereby opening the cover to a small extent and enabling a person to grasp the cover at the edge and complete the opening operation.

A tape storage compartment of this invention is shown incorporated in a different type of vehicle seat in FIG. 5. Whereas the seat shown in FIG. 1 was formed with a single seat back, the seat 48 shown in FIG. 5 includes two separate and independent seat backs 49 that are separated to provide a space for an arm rest 50. This arm rest is also pivotably attached to the seat frame and is selectively movable from the illustrated position to an upright position into the plane of the seat backs 49.

FIG. 6 illustrates incorporation of a tape storage compartment embodying this invention into the center control console 51 of a vehicle. This console 51 is generally fabricated as a unitary plastic housing with a rear portion 52 elevated to also function as an arm rest and is positioned between the two separated front seats (not shown) of the vehicle. A body 15a of a storage compartment constructed as previously described, excluding the support brackets and pivot pins, may be readily mounted in fixed relationship in the upper part of the rear portion 52 and provided with a cover 16a. The cover 16a is provided with an exterior padding and upholstery covering and functions as an arm rest. A lock device 53 is also provided for securing the cover to the body 15a.

It will be readily apparent that a novel tape storage compartment is provided by this invention for incorporation in an automobile arm rest. This structure provides safe and secure storage for the tapes preventing physical damage to the tapes as well as from heat as well as greater safety for the vehicle's occupants. The movable follower plate being spring biased maintains the tapes in an upright, serially arranged relationship automatically accommodating insertion and removal of one or more tapes. The cover maintains the tapes within the body when the arm rest is pivoted to an upright position.

Having thus described this invention, what is claimed is:

1. An automobile arm rest with storage compartment for sound recording tapes comprising An elongated body having a bottom wall, sidewalls and end walls defining an open topped cavity adapted to receive a plurality of the tapes in upstanding, serially disposed relationship, each of said sidewalls having an elongated slot extending longitudinally thereof, said body including hinge pivots interconnectable with support brackets of a vehicle seat;

a follower plate transversely disposed in said body cavity in upright relationship and movable longitudinally thereof, said plate provided with support trunnions projecting laterally from each side thereof into a respective slot of an adjacent sidewall and movable longitudinally thereof;

spring means interconnected between said body and said follower plate biasing said follower plate toward one of said body end walls, and a cover hingedly connected with said body and selectively positionable in closing relationship to the open top of said body cavity, said body and cover including latch means cooperatively interengageable to maintain said cover in closed relationship to said body.

2. An arm rest according to claim 1 which includes at least one partition plate transversely disposable in upright relationship in said body cavity between a pair of adjacently disposed tapes, said partition plate provided with support trunnions projecting laterally from each side thereof into a respective slot of an adjacent sidewall and movable longitudinally thereof.

3. An arm rest according to claim 2 wherein said partition plate is formed with a finger notch at the upper end thereof to facilitate gripping of a tape.

4. An arm rest according to claim 1 wherein said follower plate trunnions are configured to interlock with said respective slot to prevent disengagement therefrom.

5. An arm rest according to claim 4 wherein said trunnions are formed with a recessed surface portion at the point of interengagement with said slot with the adjacent portions dimensionally greater than the width of said slot and include an axial extension projecting outwardly from said body and engaged with said spring means.

6. An arm rest according to claim 1 wherein said spring means comprises a helical coil spring extending longitudinally of said body exteriorly of each respective sidewall with one end secured to a respective trunnions of said follower plate and the other end secured to said body adjacent said body end wall toward which said follower plate is biased.

7. An arm rest according to claim 6 wherein said body includes an elongated housing formed on the exterior of each sidewall in shielding relationship to said follower plate trunnions and said springs.

8. An arm rest according to claim 1 having a layer of thermally insulative material attached to the exterior surfaces of said body and said cover.

9. An arm rest according to claim 1 having a layer of shock absorbing material placed on the interior surface of said body bottom wall, said follower plate having a bottom edge thereof disposed in spaced relationship to the upper surface of said shock absorbing material.

10. An arm rest according to claim 9 wherein said body cavity is of a depth such that said cover engages the upper end of the tapes disposed therein when said cover is closed.

* * * * *